(12) United States Patent
Mahapatra et al.

(10) Patent No.: US 12,301,785 B1
(45) Date of Patent: May 13, 2025

(54) SELECTIVE DATA ENCODING AND MACHINE LEARNING VIDEO SYNTHESIS FOR CONTENT STREAMING SYSTEMS AND APPLICATIONS

(71) Applicant: NVIDIA Corporation, Santa Clara, CA (US)

(72) Inventors: Pratyush Mahapatra, Santa Clara, CA (US); Ruthie Lyle, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/045,915

(22) Filed: Oct. 12, 2022

(51) Int. Cl.
*H04N 19/103* (2014.01)
*H04N 19/146* (2014.01)
*H04N 19/156* (2014.01)

(52) U.S. Cl.
CPC ......... *H04N 19/103* (2014.11); *H04N 19/146* (2014.11); *H04N 19/156* (2014.11)

(58) Field of Classification Search
None
See application file for complete search history.

(56) References Cited

U.S. PATENT DOCUMENTS

| | | | |
|---|---|---|---|
| 9,609,277 B1 * | 3/2017 | Chen | H04N 7/155 |
| 10,863,179 B1 | 12/2020 | Nandakumar | |
| 11,580,737 B1 | 2/2023 | Miller-Smith | |
| 2010/0162313 A1 | 6/2010 | Ruiz-Velasco | |
| 2011/0279638 A1 | 11/2011 | Periyannan | |
| 2017/0134828 A1 | 5/2017 | Krishnamurthy | |
| 2017/0330029 A1 | 11/2017 | Turcot | |
| 2018/0014022 A1 * | 1/2018 | Cho | H04N 19/103 |
| 2018/0098030 A1 | 4/2018 | Morabia | |
| 2018/0367757 A1 | 12/2018 | Faulkner | |
| 2019/0114549 A1 | 4/2019 | Olsher | |
| 2019/0188479 A1 | 6/2019 | Balasubramanian | |
| 2019/0230310 A1 | 7/2019 | Faulkner | |
| 2020/0074229 A1 | 3/2020 | Alshikh | |
| 2020/0186749 A1 | 6/2020 | Ai | |
| 2021/0329306 A1 | 10/2021 | Liu et al. | |

(Continued)

OTHER PUBLICATIONS

U.S. Appl. No. 17/382,027, filed Jul. 21, 2021.

(Continued)

*Primary Examiner* — Samuel D Fereja
(74) *Attorney, Agent, or Firm* — Plumsea Law Group, LLC

(57) ABSTRACT

Systems and methods of selectively compressing video data are disclosed. The proposed systems provide a computer-implemented process configured to classify a person's behavior(s) during a video and encode the behaviors as a representation of the video. The encoding will be tailor-generated based on the specific display configuration of the target device at which playback is expected to occur. Target device displays with lower resolution and video quality characteristics will trigger an encoding of the video data that has less complexity than target device displays with higher resolution and video quality characteristics. When playback of the video is requested at the target device, a reconstruction of the video is generated by a video synthesizer based on a reference image of the person and the encoding rather than the original video file, significantly reducing memory, processing, power, and bandwidth requirements.

20 Claims, 11 Drawing Sheets

(56) References Cited

U.S. PATENT DOCUMENTS

| | | |
|---|---|---|
| 2022/0084273 A1 | 3/2022 | Pan |
| 2022/0207262 A1* | 6/2022 | Jeong .................. G06V 40/171 |
| 2022/0308742 A1 | 9/2022 | Ziv |
| 2022/0405316 A1 | 12/2022 | Raj |
| 2022/0408056 A1* | 12/2022 | Zheng ..................... G09G 5/12 |
| 2023/0062704 A1* | 3/2023 | Rösner ................ H04N 19/423 |

OTHER PUBLICATIONS

U.S. Appl. No. 63/320,864, filed Mar. 17, 2022.
U.S. Appl. No. 17/664,265, filed May 20, 2022.
U.S. Appl. No. 18/049,446, filed Oct. 25, 2022.
U.S. Appl. No. 17/933,186, filed Sep. 19, 2022.
Non-Final Office Action mailed Nov. 24, 2023 in U.S. Appl. No. 17/664,265.
Wang et al.; "One-Shot Free-View Neural Talking-Head Synthesis for Video Conferencing"; Available online at: <https://arxiv.org/pdf/2011.15126.pdf>; Apr. 2, 2021; 16 pages.
Non-Final Office Action mailed Feb. 15, 2024 for U.S. Appl. No. 18/049,446.
Final Office Action mailed Mar. 28, 2024 for U.S. Appl. No. 17/664,265.
Non-Final Office Action mailed Apr. 11, 2024 for U.S. Appl. No. 17/933,186.
Notice of Allowance Mailed on Jul. 29, 2024 for U.S. Appl. No. 17/664,265.
Notice of Allowance Mailed on Aug. 7, 2024 for U.S. Appl. No. 17/933,186.
Corrected Notice of Allowance mailed on Aug. 8, 2024 for U.S. Appl. No. 17/664,265.
Final Office Action Mailed on Sep. 24, 2024 for U.S. Appl. No. 18/049,446.

* cited by examiner

| | | VIDEO MODULATION → ENCODING | | | | SYNTH. VIDEO FILE SIZE |
|---|---|---|---|---|---|---|
| | | COLOR | RESOLUTION | FRAME RATE | FRAME SKIPS | |
| ORIGINAL VIDEO FILE SIZE 20 MB | DESTINATION DEVICE | | | | | |
| 710 → | E-INK NEW VIDEO MESSAGE  16 FPS DISPLAY CONFIGURATION "A" | 10% | 50% | 5% | 60% | 20 KB |
| 720 → | 1 NEW VIDEO MESSAGE  30 FPS DISPLAY CONFIGURATION "B" | 25% | 70% | 20% | 45% | 35 KB |
| 730 → | 1 NEW VIDEO MESSAGE  60 FPS DISPLAY CONFIGURATION "C" | 40% | 30% | 65% | 30% | 55 KB |

FIG. 7

SELECTIVE DATA ENCODING AND MACHINE LEARNING VIDEO SYNTHESIS FOR CONTENT STREAMING SYSTEMS AND APPLICATIONS

TECHNICAL FIELD

The present disclosure generally relates to data compression. At least one embodiment pertains to selectively encoding video data based on the requirements of the receiving device, and then reconstructing one or more video frames based on said encoding using machine learning models.

BACKGROUND

Data compression is widely used to reduce the amount of data required to process, transmit, or store a given quantity of information. Data compression refers to rooting out the repetitive or identical portions and keeping only those portions which are essential. Compression can be used, for example, to reduce the storage requirements for files, to increase the communication rate over a channel, or to reduce redundancy prior to encryption for greater security.

In many areas of modern computing, processing, transmission, storage, and playback of video data is critical to achieving targeted performance, for example video streaming applications, teleconferences, cloud-based gaming, and the like. Video compression techniques are commonly used to pre-process video data prior to use by other applications, to reduce data storage and or transmission requirements for pre-recorded and/or streamed video data. Compression processing of data can facilitate transmitting video data at lower bit rates and storing video data using less storage space.

While conventional video compression techniques can be effective at reducing the size of video bit streams, these techniques are typically computationally intensive. In addition, conventional compression codecs typically have struggled to keep up with the demand for greater video quality and resolution on memory-constrained devices, such as smartphones and other mobile devices, operating on limited-bandwidth networks. Furthermore, the storage requirements for these compressed (encoded) data continue to increase as video resolution increases and as users increasingly rely on video during conferences and other interactions. There is a need for a video compression and retrieval technique that addresses the shortcomings described above.

SUMMARY

In one aspect, a computer-implemented method includes receiving, at a data reduction system, first video content designated for delivery to a computing device, the first video content including a first set of frames (comprising a plurality or sequence of at least two individual frames), and determining, at the data reduction system, that a first display for the computing device is associated with a display configuration. In addition, the method includes calculating, at the data reduction system, a first value for a video content parameter based on the first display configuration, and encoding only a first subset of the first set of frames (where the first subset is smaller than the full first set of frames) to produce an encoded file representing the entire first video content, the first subset selected based on the first value of the first video content parameter.

In another aspect, a computer-implemented method includes receiving, at a data reduction system, first video data designated for delivery to a computing device, the first video data including a first set of frames (comprising a plurality or sequence of at least two individual frames), and encoding only a first subset of the first set of frames (where the first subset is smaller than the full first set of frames) to produce an encoded file representing the entire first video content. In addition, the method includes identifying, at the data reduction system, a first battery level of the computing device, and a fourth operation includes routing, in those cases where the first battery level is determined to be above a first threshold, the encoded file to a first inference engine running on the computing device and causing the first inference engine to generate, in lieu of the first video content, a first synthesized video based on the encoded file. Furthermore, the method includes routing, in cases where the first battery level is determined to be below the first threshold, the encoded file to a second inference engine running on a remote server and causing the second inference engine to generate, in lieu of the first video content, the first synthesized video.

In another aspect, a computer-implemented method includes receiving, at a data reduction system, first video data designated for delivery to a computing device, the first video data including a first set of frames (comprising a plurality or sequence of at least two individual frames), and encoding only a first subset of the first set of frames (where the first subset is smaller than the full first set of frames) to produce an encoded file representing the entire first video content. The method also includes identifying, at the data reduction system, a first bandwidth of the computing device, and a fourth operation of routing, in cases where the first bandwidth is determined to fall below a first threshold, the encoded file to a first inference engine running on the computing device and causing the first inference engine to generate, in lieu of the first video content, a first synthesized video based on the encoded file. The method also includes routing, in cases where the first bandwidth is determined to fall above the first threshold, the encoded file to a second inference engine running on a remote server and causing the second inference engine to generate, in lieu of the first video content, the first synthesized video.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 7 is a table depicting three examples of different target devices and the effect of each device display's configuration on the selected video content parameters, according to an embodiment.

DESCRIPTION OF THE EMBODIMENTS

Figure 1A:
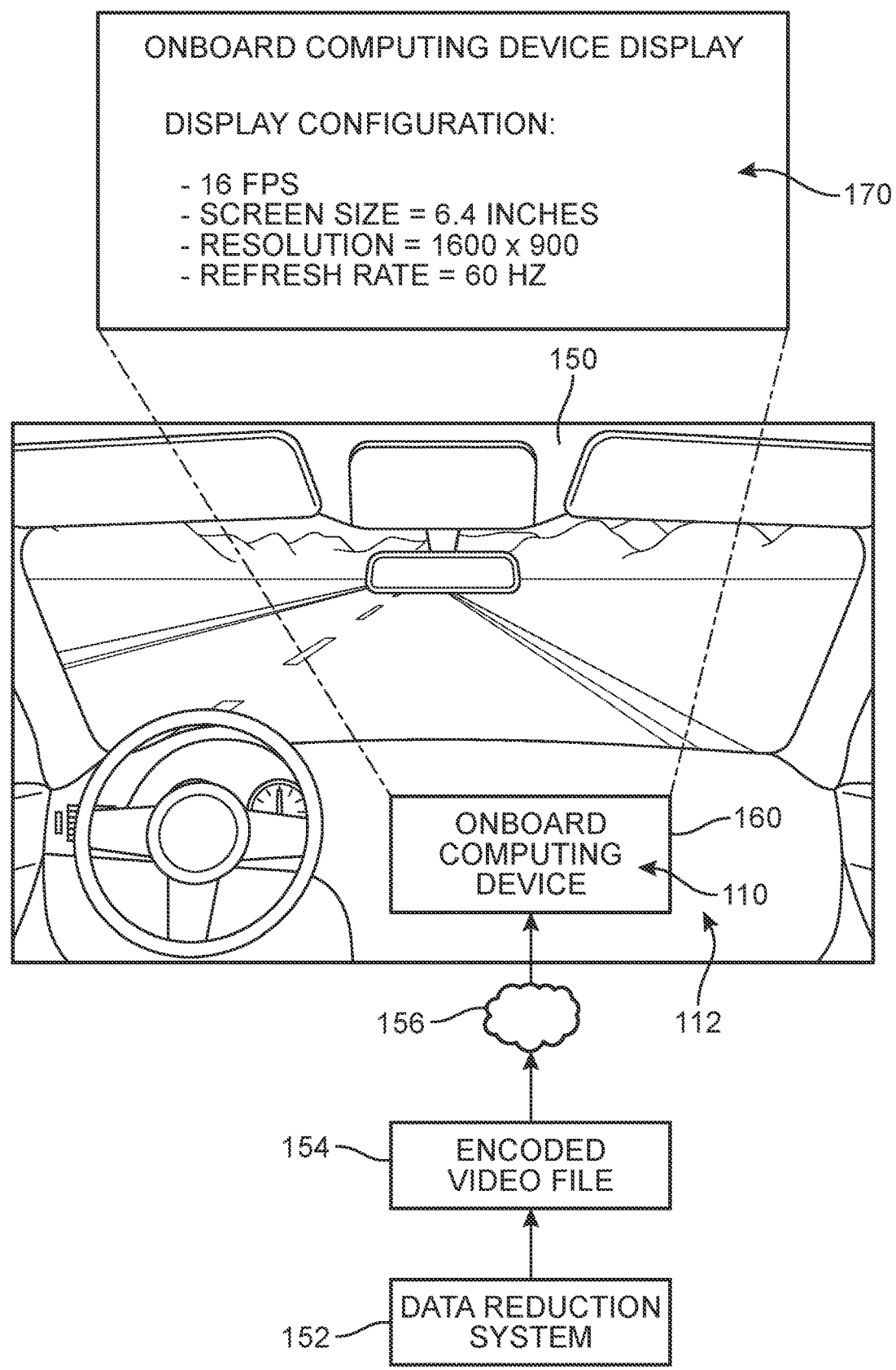
FIGS. 1A and 1B depict an overview of an implementation of the video data reduction system causing playback of a synthesized video that was selectively encoded based on the target device display configuration, according to an embodiment.

Digital video requires a significant amount of storage space or bandwidth in its original uncompressed form. Video coding or video compression is the process of compressing (encoding) and decompressing (decoding) video. Video compression makes it possible to transmit or store digital video in a smaller, compressed form. Many video compression standards, including MPEG-2, MPEG-4 and H.264, are well-known in the art today. However, while such standards are useful, the storage needed for conventionally encoded video data remains considerable. The generative adversarial network (GAN) framework has emerged as a powerful tool for various image and video synthesis tasks, allowing the synthesis of visual content in an unconditional or input-conditional manner. It has enabled the generation of high-resolution photorealistic images and videos, a task that was challenging or impossible with prior methods. It has also led to the creation of many new applications in content creation.

The proposed systems and methods take advantage of improvements in video synthesis to provide a video compression technique that is computationally efficient, and provides a substantial reduction in video size. As will be discussed in greater detail below, the proposed (real-time or offline) encoding process tracks and records the dynamic behaviors and audio for one or more participants in a video conference call using a series of codes. The codes, provided to what has been described as a "talking-head video synthesizer" or inference engine (see below), will reconstruct a simulated playback of the original video. Thus, the size of the file drops to reflect only the size of the original image used by the video synthesizer and a code document, leading to a significant reduction in bandwidth and vastly improved compression ratios than existing methodologies.

More specifically, the proposed data reduction system implements a customized or tailored approach when producing the encoded video data based on the characteristics and display capacity of the designated target device. In different embodiments, the system is configured to make automated case-by-case adjustments to video quality-related parameters based on the characteristics of the display on which the video is to be presented (also referred to herein as the "target display", or the display for the target device). In other words, the extent to which the video will be diminished (e.g., reduction in the frames per second, lower resolution, etc.) in its encoded version will be directly responsive to the capacity of the display on which playback of the synthesized video is to occur. Thus, in the case of playback for a high-resolution display, the encoded video file for an original video will include coding representing a greater level of discrimination compared to the encoded video file for the same original video that is to played back on a low-resolution display, which instead will include coding with relatively less discrimination. In addition, in some embodiments, more dynamic factors such as the bandwidth and/or battery life available to the target device can influence the selection of where the subsequent video synthesis will occur (i.e., in the cloud, at another remote processing site, or at the local target device itself).

As a general matter, video synthesis focuses on generating video content that preserves the temporal consistency of the output videos. This is usually achieved by using a temporal discriminator, flow-warping loss on neighboring frames, smoothing the inputs before processing, or a post-processing operation. Conditional video synthesis generates videos conditioning on input content (e.g., future frame prediction, high-level representation input video, etc.). Some of the proposed embodiments can be understood to incorporate at least two major domains of conditional video synthesis: face reenactment and pose transfer. Face reenactment usually starts by collecting footage of the target person to be synthesized.

Some recently designed GAN frameworks only need a single 2D image of the target person (also referred to herein as a portrait or reference frame) and can synthesize talking videos of this person given arbitrary motions. These motions are represented using either facial landmarks or key points learned without supervision. Since the input is only a 2D image, many methods rely on warping the input or its extracted features and then fill in the un-occluded areas to refine the results. To synthesize the target identity, features are extracted from the source images and information is injected into the generator. Since these methods require only an image as input, they become particularly powerful and can be used in even more cases. Similarly, pose transfer techniques aim at transferring the body pose of one person to another person. It can be seen as the partial or whole body counterpart of face reenactment. Recent works have shown their capability to generate high quality and high-resolution videos for challenging poses.

More specifically, a pure neural rendering approach has been developed by which a talking-head video using a deep network in the one-shot setting is rendered without using a graphics model of the 3D human head. This type of approach can in some cases directly synthesize accessories present in the source image, including eyeglasses, hats, and scarves, without their 3D models. In different embodiments, the encoded behavior of video participants is reconstructed via a local free-view video synthesis model where one can freely change the viewpoint of the talking-head within a large neighborhood of the original viewpoint. The reconstruction model achieves this capability by representing a video using a novel 3D key point representation, where person-specific and motion-related information is decomposed. Both the key points and their decomposition are learned without supervision. Some examples of these techniques are described in further detail in U.S. Patent Publication No. 2021/0329306 published on Oct. 21, 2021 and titled "Video Compression using Neural Networks" to Ming-Yu Liu, et al. (hereinafter the Liu application), the disclosure of which is incorporated by reference in its entirety. The embodiments described herein apply these video synthesis techniques in order to facilitate the data compression and subsequent data presentation based on a digital avatar.

Thus, as original video content is received at the data reduction system, a behavior recognition model can review, in near-real-time, the facial expressions and gestures and other actions of a given participant (collectively referred to as behaviors). Each behavior can be detected and fall under a previously defined class or label. The behavior recognition model will classify the behaviors observed in a video stream, and an encoder will, based on the classification, produce a series of codes or symbols that represent the various changes in expression and pose of the participant over time. These timestamped encoded behaviors can be stored as a representation of the video data itself. When viewing of the video is desired, the compressed data is provided to at least one of a video synthesis machine learning models, for example a generative adversarial network (GAN) or Video-to-video synthesis (vid2vid) or the like, also referred to herein as an inference engine. It is to be understood that the inference engine also receives audio data and/or transcription data which can be used in parallel with the outputted synthesized video in cases where the video includes speech or otherwise has sounds present in the video stream. In order to generate a synthetic video, the inference engine obtains or receives an initial reference frame (also referred to herein as a reference image or reference clip). With the reference frame and timestamped encoded behaviors, a simulated/synthesized video can be produced in which the person(s) shown does not remain unrealistically static, nor do they display random or inauthentic expressions. Instead, the simulated video presents the person engaging in their true-to-life behaviors, such as nodding, shaking their head, laughing, smiling, coughing, turning their face away, closing their eyes, resting their chin in their hand, etc., at or around the times that they actually exhibited such behavior when the video was captured.

As a general matter, the embodiments can be used with both live video streaming, as well as pre-recorded videos. As non-limiting examples, a video stream can be obtained during a video conferencing session in one example, between one or more senders and one or more receivers (collectively referred to as "participants"), or a YouTube®, Netflix®, or other video storing and/or streaming services-based video. In one embodiment, video streaming comprises video conferencing or teleconferencing. Thus, videos that are created in "real-time" (e.g., during a video conference application) as well as streaming videos can benefit from the proposed systems and methods. Similarly, two distinct video streams that are combined at a receiving device (e.g., "video within video" (e.g., a video "watch party" via a streaming service) can also be encoded and synthesized using the techniques described herein, where both video content and meeting content are encoded and synthesized simultaneously.

Video streaming comprises, in an embodiment, video game streaming and video game streaming services. In one embodiment, video streaming comprises digital satellite video streaming, such as digital satellite television streaming. In another embodiment video streaming comprises broadcast video streaming. Video streaming, in an embodiment, comprises internet video streaming. In one embodiment, video streaming comprises digital video broadcasting. Video streaming, in an embodiment, comprises any Advanced Televisions Systems Committee (ATSC) approved television or other video broadcast technique, such as cable or broadcast television. In another embodiment video streaming comprises any ATSC mobile/handheld (ATSC-M/H) video broadcast method. In one embodiment, video streaming comprises closed circuit television streaming and other closed circuit digital video capture or broadcast. In another embodiment video streaming comprises video capture and encoding performed by personal digital cameras, such as DSLR cameras, to store, encode, and transmit digital video data. In one embodiment, the proposed embodiments are usable for any video streaming and/or video capture application described above or further described herein. In other examples, a previously recorded video stored remotely can be encoded as described herein for a simplified and near-instantaneous "download" and playback of the video content at a local device.

As will be described in greater detail below, the proposed systems and methods offer substantial reduction in inferred video file transmission size and computational load by selectively encoding video content based on target display configuration, also resulting in an increase in processing speed. In one embodiment, the system further offers the ability to dynamically assign resources for processing between one or more remote servers and the local target device. For example, the system can include an integrated machine learning module that can be used to train a neural network over time using historical data encoding results for multiple device displays for different situations (e.g., a display for a device 'in motion' (such as in a vehicle, or traveling on some other mode of transportation), poor bandwidth, etc.), such that encoding is translated or inferred before being transmitted to the device. In some cases, the decision will be adaptable to changing conditions. As a non-limiting example, if toward the beginning of the transmission, the inference is designated by the system so as to be performed in the cloud, a switch can automatically be triggered when the target device battery life increases above a preset threshold (or vice versa). Conversely, if toward the beginning of the transmission, inference was designated by the system so as to be performed at the target display, a switch can automatically be triggered when the target device bandwidth crosses a preset threshold (or vice versa).

Figure 1B:
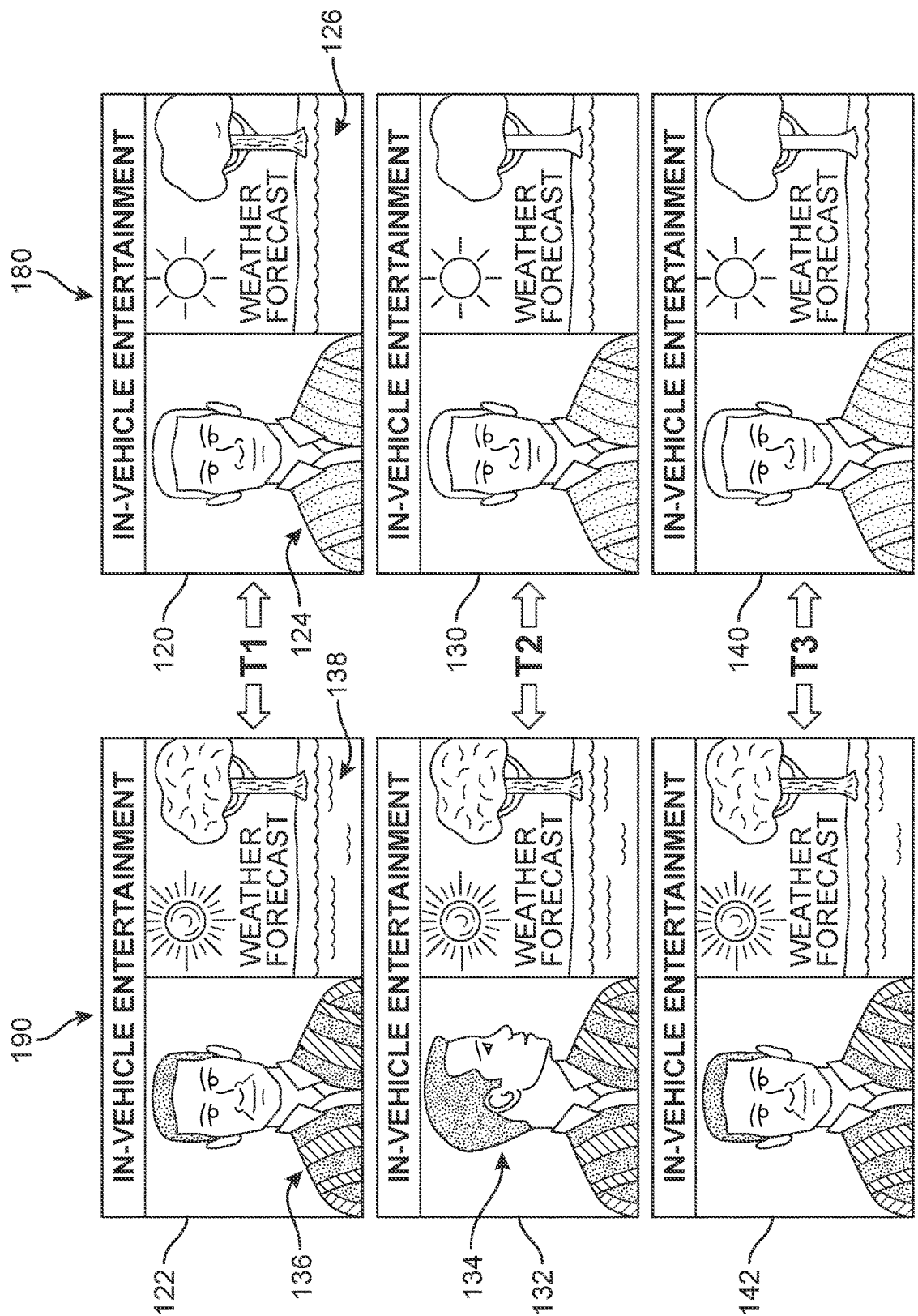

For purposes of introduction, FIGS. 1A and 1B present an implementation where playback of a first video is to occur via a first display 110 for an onboard computing device 160 installed in a first autonomous vehicle (AV) 150. In FIG. 1B, a first high-quality video 190, represented by a first sequence of three frames (122, 132, 142) is shown on the left. Following processing by an embodiment of the data reduction system ("system") 152 (depicted in FIG. 1A), the first high-quality video 190 was converted by an encoding process to a set of codes or symbols to produce an encoded video file 154. The symbols stored in the encoded video file 154. This encoded video file 154 is then used to generate a synthesized video 180, which is represented by another sequence of three frames (120, 130, 140) in FIG. 1B arranged to the left of first high-quality video 190 for easy comparison.

As noted above, in different embodiments, the proposed system is configured to adjust or modify the complexity captured in the encoding of the first high-quality video 190 to better align with the playback capabilities of the target (receiving) computing device display. As a general matter, device displays are associated with a set of specifications (e.g., resolution, screen size, frame per second (FPS), refresh rate, DPI, etc.). Collectively, these values will be referred to herein as the display's configuration. For purposes of this application, the configuration of a display may be referred to as 'low-quality' when one or more of its specifications are below a preselected threshold selected for that particular specification, and the configuration of a display may be referred to as 'high-quality' when one or more of its specifications are above a preselected threshold for that particular specification. In FIG. 1A, simply for illustrative purposes, the first display 110 is shown to have a first display configuration ("first configuration") 170 with the following values: (a) 16 FPS, (b) screen size=6.4 inches, (c) resolution=1024×600, (d) refresh rate=60 Hz, and DPI (dots per inch)=170. These values represent a low-quality configuration. In comparison, it may be understood in this scenario that the first high-quality video 190 depicted in FIG. 1B was created via a recording device designed for video presentation on a relatively higher quality display. As an example, the first high-quality video 190 can have a resolution of 4000×4000 at 300 DPI, which is conventionally understood to correspond to the lowest standard for a high quality image resolution (e.g., for something like a photo or brochure that is printed). In contrast, a value of 72 DPI would represent a common webpage resolution. In other words, the first high-quality video 190 could be played on an HD screen or printed as a large poster while retaining its crisp, sharp edges and colors, while a 72 DPI image would not. The smaller the DPI and/or resolution, the blurrier the image(s) tend to appear.

Thus, the reader may appreciate that the first high-quality video 190 has a file size and complexity that far exceeds what the first display 110 is capable of actually showing. The data reduction system is configured to identify the target display's configuration, and—based on this information—determine a complexity level that should be applied or retained during the encoding process. This is exemplified in the example of FIGS. 1A and 1B, where the data reduction system has received the first high-quality video 190, identified the display configuration (first configuration 170) for the target display (first display 110), encoded the first high-quality video 190 based on the first configuration 170, and produced a first encoded file 154 for delivery over a network 156 to the onboard computing device 160 of the first autonomous vehicle 150. The onboard computing device 160 includes an inference engine (not shown in FIG. 1A) configured to decode the first encoded file 154 and generate synthesized video 180.

In FIG. 1B, the three frames (122, 132, 142) of first high-quality video 190 and the three frames (120, 130, 140) of synthesized video 180 represent the same points in time for the video. Thus, a first high-res frame 122 and a first synthetic frame 120 both correspond to a first time (T1), a second high-res frame 132 and a second synthetic frame 130 both correspond to a second time (T2), and a third high-res frame 142 and a third synthetic frame 140 both correspond to a third time (T3). In other words, first high-res frame 122 and first synthetic frame 120 are intended to convey approximately the same information, second high-res frame 132 and second synthetic frame 130 are intended to convey the same information, and third high-res frame 142 and third synthetic frame 140 are intended to convey the same information.

However, the reader may observe that the three 'frame-pairs' include some differences. This is a result of the lower-complexity encoding applied by the system 152. In other words, based on the system's assessment of the target display configuration, it was understood that the first display 110 was simply not capable of showing these types of details in any event, and so there was no benefit to encoding the first high-resolution video 190 in its full complexity. More specifically, details like color complex patterns 136 (represented by two different cross-hatching styles in the shirt and another style in the sun) captured in the first high-resolution video 190 have been generalized to a more monochrome color (represented by other types of cross-hatching styles in the drawing) in the synthesized video 180. Similarly, resolution-dependent details 138 that were visible in the first high-resolution video 190 such as leaves on the tree and/or ripples in the water cannot be seen in the synthesized video 180, and more importantly, would not have been visible via the first display 110 even if the original first high-resolution video 190 were streamed, due to the low quality configuration of the display. Finally, it can be understood that the number of frames per second captured in the first high-resolution video 190 was far greater than the FPS available for the first display 110. As a result, during the encoding process, the system 152 selectively reduced or culled the video FPS to be near or at the same FPS that can be presented by the first display 110. In other words, although the first high-resolution video 190 may have included (as a non-limiting example) extremely brief changes in pose of a speaker 134 being shown in the frames (shown turning his head to the right in second high-res frame 132), the encoded file (e.g., see for comparison second synthetic frame 130) has encoded fewer frames than were captured in the first high-resolution video 190. Thus, the synthesized video 180, when decoded, 'skips' or ignores those frames that would not be visible on the first display 110 in any case. This allows for a significant reduction in size of not only the first encoded file 154, but also the video that is synthesized based on the first encoded file 154, which is significantly smaller than the original video file. Such a reduction occurs with little to no effect on the perception of quality by human eyes in the real-world with respect to the appearance of the images on the specific target display, which could not have shown such details in any case. In different embodiments, the system 152 can remove, redact, or otherwise reduce aspects, features, characteristics, etc. during its encoding of an original video without impacting what will finally be shown on the designated target display.

Figure 2:
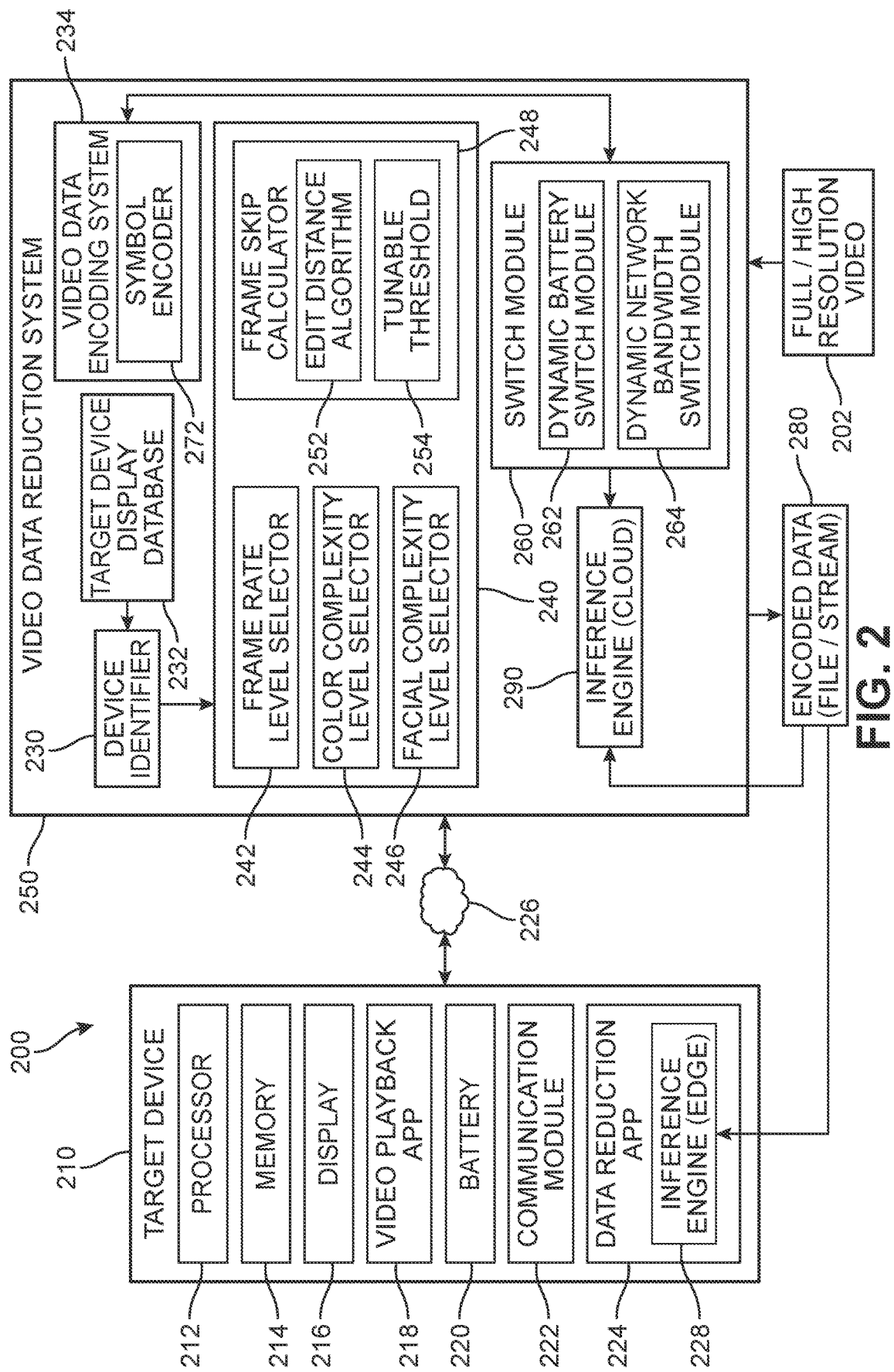
FIG. 2 depict a schematic diagram of an environment including a system for video data reduction, according to an embodiment.

Referring now to FIG. 2, an environment 200 for implementation of a video data reduction system ("system") 250 is presented. In different embodiments, one or more components/modules of the system 250 may be stored or otherwise reside locally on the user computing device, may be entirely stored in a cloud computing environment and then run on the local computing device, be mirrored across multiple user devices, or may include components residing on the local device and components residing in the cloud environment. For purposes of FIG. 2, the system 250 can be understood to reside remotely in a server or cloud network environment. In some embodiments, one or more components of the system 250 can be located in an offsite micro data center that associated with the user's cellular network. Thus, the encoding would happen nearer (but still remote relative to) the target device, and the final transmission of data to the target device will be relatively less costly.

As shown in FIG. 2, system 250 includes a plurality of components and/or modules. When video content such as original video content 202 is received by system 250, the sequence of frames can be analyzed by a video data encoding system 234. Additional details and context regarding the video data encoding system and process can be found in U.S. patent application Ser. No. 17/664,265 (Plumsea Ref 196-1009) filed on May 20, 2022 and titled "Conversational AI-Encoded Language for Data Compression" to Mahapatra, et al. (hereinafter the Mahapatra application), the disclosure of which is incorporated by reference in its entirety.

In different embodiments, the target device 210 can refer to a variety of computing device types, such as but not limited to a desktop computer, laptop, notebook, tablet, smartphone, smartwatch, etc. Each device can include an electronics unit comprising a plurality of different components, such as a user interface component (e.g., a touch-screen display, keyboard, mouse, microphone, speaker, etc.), a user interface module, a processor 212, and/or a communication module. As used in this description, the term "module" is intended to include, but is not limited to, one or more computers, processing units, or devices configured to execute one or more software programs that include program code that causes a processing device(s) or unit(s) of the computer to execute one or more functions. The device may include a system including one or more processors 212 and memory 214. Memory 214 may comprise a non-transitory computer readable medium. Instructions stored within memory 214 may be executed by the one or more processors 212. The device may be configured to receive and analyze data from various input sensors associated with the device or data that is communicated from external components or devices connected to the device.

In addition, target device 210 includes a communication module 222 that may allow the device to communicate, for example by enabling access to a wireless network 226; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In one embodiment, the target device 210 is configured to receive video data, for example during interaction with a videoconferencing application. For example, target device 210 can receive encoded video data and present this content using video streaming software and/or translation by the inference engine 224. In one embodiment, the video content is the encoded data comprising information usable to reconstruct or regenerate one or more images or video frames, where said information is generated, in part, by one or more devices and components of system 250. In different embodiments, target device 210 can refer to a computing system or any other computing device comprising one or more video and audio components, such as a display 216, battery 220, a video playback app 218, and a data reduction app 224 (with optional local inference engine 228, also referred to herein as a video decoder/synthesizer). In some embodiments, the video playback app 218 functionality is included in the data reduction app 224, while in other embodiments, the features of the data reduction app 224 are implemented separately, preparing the synthetic video before playback in the video playback app 218 is initiated.

User interfaces for APIs (application programming interfaces) such as the video playback app 218 or data reduction app 224 can be used to facilitate an end user's interaction with, for example, a distributed computing environment (e.g., a web-based application), or an application residing wholly on a single computer system (e.g., a stand-alone application). In different embodiments, one or more of the computing devices can include device display ("display") 216 that can, for example, present information and media for a software application ("app"). In some embodiments, the app is associated with or is a platform providing the audio modification assistant service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device. In some cases, while the client software that allows users to perform various tasks may be run on user device, some of the software data may be retrieved from and stored on databases associated with a remote server.

In some embodiments, the target device user can receive and send information through a user interface that may be presented on the device display 216, which may be associated with an app. In some embodiments, the display 216 may be a touchscreen, allowing the user to interact with the user interface directly by touch. The user interface may refer to an operating system user interface or the interface of one or more software applications that may run on the device. In some embodiments, the user interface can include a messaging window or other chat-space by which the local instance of may present messages or other digital content or the user may provide input. In addition, the app and/or a VoIP service is configured to receive user voice inputs via an audio input device such as a microphone or other input devices 214 such as a text-to-voice or gesture-to-voice device, and components to present audio outputs (authentic and/or synthesized voices) via audio output devices such as a speaker or headphones. In some embodiments, the display is an E-ink reader display (high resolution, with a very low frame rate), an infotainment display (low resolution and low frame rate), a smartwatch screen (small display with low resolution but a higher frame rate), or a tablet touchscreen, etc.

In some embodiments, the data reduction app 224 can offer a user settings and profile interface for accessing and modifying settings and viewing application activity. Selections made from the profile interface can include app-related user-specific information such as user settings, the user's selected video processing preferences, as well as an optional app activity history repository that can store and present to the user various data reflecting past app-based feedback or other responses. In some embodiments, the app can be configured to connect to the cloud (for example, via a Wi-Fi or cellular connection) to add or modify information for the user account that can also or alternatively be stored in the cloud, for example in a user account database.

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "triggering", "actuation", "triggering event", or "actuation event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

As shown in FIG. 2, the system 250 includes an intelligent video quality video content module ("video modulator") 240, which further includes a frame rate selector 242, a color complexity level selector 244, a facial complexity level selector (directed to the resolution or details that will be represented in the video) 246, and a frame skip calculator 248. The operation of each of these components will be discussed below. In different embodiments, the data reduction app 224 can receive selections from a user that can affect the decisions made by the video modulator 240. Preferences can, for example, determine the maximum number of frames the system 250 can skip during encoding, a minimum and/or maximum frame rate that should be maintained during encoding, a minimum and/or maximum color complexity that should be encoded, and minimum and/or maximum facial expression complexity that should be encoded, which will affect the activity and operation of the video data encoding system 234. In other embodiments, for example in cases where the user does not select any preferences, default settings will be applied in the performance of the video modulator 240.

The system 250 also includes a device identifier module ("device identifier") 230 configured to request and receive data about the prospective target device. Furthermore, in some embodiments, the system 250 further includes or otherwise enables remote access to or communication with a target device display database 232. In one example, the device identifier 230 is configured to receive a request for a video transmission at a target device and determine the characteristics (i.e., configuration) of the target device's display. In some embodiments, the device identifier 230 is able to detect or recognize this information from the request, ping the target device 210 for information (for example, via communication with the local data reduction app 224), or identify the general model or type of device based on its communication stream with the target device, and ascertain the necessary information by reference to the target device display database 232, which includes display configuration data for various types of computing devices.

Thus, in some embodiments, when original video content 202 is received by the system 250, the device identifier 230 functions by classifying the target device display or otherwise generating an output describing the target device display's configuration, thereby identifying the value for each specification ("spec") associated with the target display. This information is then shared with each of the modules of the video modulator 240, which rely on the device configuration data in determining what level of complexity or quality from the original video content will be carried forward into the encoded file produced by the video data encoding system 234. In different embodiments, system 250 converts original video content to video frames or other data using one or more neural networks. In one embodiment, system 250 comprises one or more parallel processing units (PPUs), such as graphics processing units (GPUs).

As a general matter, the frame rate selector 242, color complexity level selector 244, and facial complexity level selector 246 are each configured to make a selection in response to the identified display specification(s) that is/are directly relevant to the module. Thus, in different embodiments, the frame rate selector 242 is configured to select a frame rate that approximately matches or equals the frame rate specification that was identified for the specific target device display, as determined by the device identifier 230. In some cases, a particular display frame rate may elicit a selection of a specific frame rate based on ranges (e.g., if a device display has a frame rate between 16 FPS and 32 FPS, then the frame rate selected by the frame rate selector 242 will be a fixed FPS that was predesignated for that FPS range). In other cases, the frame rate selector 242 will assign or select the same frame rate that the target device display is known to offer (e.g., if a device display has a frame rate of 16 FPS, then the frame rate selected by the frame rate selector 242 will be 16 FPS, while a device display that has a frame rate of 24 FPS will lead to selection of a frame rate by the frame rate selector 242 of 24 FPS). The output of the frame rate selector will then be conveyed to the video data encoding system 234. Thus, in cases of a display with an extremely low frame rate such as an E-ink/E-paper display, many of the frames of the original video content would be precluded from playback, regardless of the data in the original video file. For example, if a first frame were presented on the E-ink display, the next frame would not be the subsequent frame from the original video, but would instead be the fifth frame (skipping the second, third, and fourth frames). This information is used by the frame rate selector 242 to remove or skip those intermediate frames that would not be visible to the recipient on their target device in any case. In some embodiments, the video can be converted into a kind of GIF (which has a very low FPS) or other reduced data format video.

Similarly, the color complexity level selector 244 is configured to select a color depth and rendition level that approximately matches or equals the color specifications that were identified for the specific target device display, as determined by the device identifier 230. Color depth or saturation defines the number of colors used to build an image (how rich in colors the image is), and image color rendition format fixes the number and the sequence of digitized video signal bits, that contains its color depth data. Thus, a digitized video stream with a higher color depth and/or rendition (collectively referred to herein as color complexity) will also require a larger streaming size, HDD capacity, and channel capacity to transmit it. However, regardless of how much detail and complexity of color is stored in the original image or video file, whether that level of detail and complexity is apparent to a viewer is mainly dependent on the configuration of the target display. Thus, when the device identifier 230 identifies which target display is to be used for playback of the video, it further pinpoints the maximum number of colors that target display is technically capable of showing.

In general, display monitors currently available need to accurately display full-color video signals in the number of colors generated when using eight bits for each RGB color (for a total of 24 bits) input. Using eight bits for each RGB color, roughly 16.77 million colors can be generated. However, not all displays can reproduce the entire full color range of approximately 16.77 million colors, and the mechanism by which the target display achieves its color range will also affect the final color reproduction. For example, only some LCD monitors achieve full color in the true sense of the term, reproducing each RGB color at eight bits on an LCD panel operating at eight bits, while others offer so-called virtual full color. Virtual full color products cost less to implement, but generally offer inferior capacity to express gradation than true eight-bit LCD panels. Furthermore, some displays are designed to apply frame rate control (FRC), a system for increasing the number of apparent colors by manipulating the frame rate, taking advantage of afterimage effects in the human eye. For example, switching rapidly between white and red, for example, will create what the human eye perceives as pink. These types of technologies make it possible to reproduce approximately 16.77 million colors by operating the number of bits exceeding those with traditional FRC to generate even more stimulated colors. In different embodiments, these features will be recognized by the device identifier 230 and used when determining the display monitor's ability to display tonal grades and transitions. Furthermore, the number of bits at which the display panel operates, its color look-up table (LUT), and the precision of the internal calculations all significantly affect the color reproduction capabilities of a monitor. In some cases, even displays with specs that look similar can diverge unexpectedly in display tendencies in response to small differences, and the target device display database 232 can store this information.

Thus, in different embodiments, the color complexity level selector 244 is configured to evaluate each of these color-related specs in order to determine what type and level of color complexity would be render-able by the target display. Based on this determination, the color complexity level selector 244 will select a color complexity level that is at or around what is actually render-able by the target device display, regardless of the richness of color available in the original video content, thereby significantly reducing the processing required in encoding the video as well as the subsequent size of the synthesized video. The video data encoding system 234 will then assess the sequence of frames comprising the original video content 202 and adjust (reduce) the values of each frame's color-related features, using for example the color layout descriptor, edge histogram descriptor, and the scalable color descriptor (e.g., the Scalable Color Descriptor and the Color Layout Descriptor for global color and color layout, and by the Edge Histogram Descriptor for texture) based on the output of the color complexity level selector 244.

A similar approach may be implemented with respect to the facial and pose complexity level selector ("facial complexity level selector") 246. As described in the Mahapatra application, in different embodiments, the video data encoding system 234 can include one or more models configured to detect and label specific human behaviors such as facial expressions, changes in pose, and gestures. As a general matter, facial expressions are the facial changes in response to a person's internal emotional states, intentions or social communications. From a computer vision point of view, facial expression analysis refers to computer systems that attempt to automatically analyze and recognize facial motions and facial feature changes from images. Facial expression analysis includes both measurement of facial motion and recognition of expression. The general approach to automatic facial expression analysis (AFEA) consists of three operations: face acquisition, facial data extraction and representation, and facial expression recognition. A participant expression model can be configured to extract and represent the facial changes caused by facial expressions. In facial feature extraction for expression analysis, there are mainly two types of approaches: geometric feature-based methods and appearance-based methods.

Depending on the different facial feature extraction methods, the effects of in-plane head rotation and different scales of the faces can be removed by face normalization before the feature extraction or by feature representation before the operation of expression recognition. Facial expression recognition is the last stage of AFEA systems. The facial changes can be identified as facial action units (AUs) or prototypic emotional expressions. In some embodiments, a facial expression model can make use of the facial action coding system (FACS), which consists of 44 facial AUs, which are codes that describe certain facial configurations, and/or emotion recognition algorithms. Thirty AUs are anatomically related to contraction of a specific set of facial muscles. It can be appreciated that the production of a facial action has a temporal evolution, which plays an important role by interpreting emotional displays. The temporal evolution of an expression is typically modeled with four temporal segments: neutral, onset, apex and offset. Neutral is the expressionless phase with no signs of muscular activity. Onset denotes the period during which muscular contraction begins and increases in intensity. Apex is a plateau where the intensity usually reaches a stable level, whereas offset is the phase of muscular action relaxation. The expression model incorporates machine learning techniques.

In some embodiments, the video data encoding system 234 can also be configured to detect and classify poses, which include human gestures and changes in body position. As a general matter, gesture can be understood to refer to the use of motions of the limbs or body as a means of expression, to communicate an intention or feeling. The majority of hand gestures produced by speakers are meaningfully connected to speech. These communicative hand movements have been defined along a "gesture Kendon's Continuum" as five different kinds of gestures including (1) Gesticulation: spontaneous movements of the hands and arms that accompany speech; (2) Language-like gestures: gesticulation is integrated into a spoken utterance, replacing a particular spoken word or phrase; (3) Pantomimes: gestures that depict objects or actions, with or without accompanying speech; (4) Emblems: familiar gestures such as "V for victory", "thumbs up", and assorted rude gestures (often culturally specific); and (5) Sign languages: Linguistic systems, such as American Sign Language, which are well defined.

Thus, in different embodiments, the facial complexity level selector 246 is configured to evaluate the target display specs for resolution, frame rate (which may be supplied by the frame rate selector 242), and/or frame skip (as provided by the frame skip calculator 248) in order to determine which level of facial complexity would actually be displayable or visible on the target display. In other words, for each type of recognizable, detectable, or classifiable facial AU and/or pose, the facial complexity level selector 246 can identify which of the facial AUs and poses could be shown/visible/render-able on the target device display—based on its identified configuration and the outputs of the three other modules in the video modulator 240 (i.e., frame rate selector 242, frame skip calculator 248 and color complexity level selector 244)—and which would be lost, blurred, or masked by the target display. Based on this determination, the facial complexity level selector 246 will select a facial complexity level that is at or below what is actually render-able by the target device display, regardless of the richness of expressive behavioral details available in the original video content, thereby significantly reducing the processing required in encoding the video as well as the subsequent size of the synthesized video.

Finally, in different embodiments, the frame skip calculator 248 is configured to identify, for the sequence of frames comprising the original video content 202, the edit distance from one frame to the next. As a general matter, to evaluate the similarity of the one frame to the next, a feature set based on color descriptors (e.g., as defined in the MPEG-7 standard) can be used to generate a vector comprising three strings for each frame. Each corresponding (adjacent) couple of corresponding strings are used to calculate an approximate distance ("edit distance"). For a shape signature, the edit distance is, for example, the sum of the pixel weights and the distance that needs to be traveled to make two signatures equal. In some embodiments, the approximate distance between the strings is evaluated using the Sellers algorithm or Levenshtein algorithm. This Sellers edit distance is similar to the Levenshtein edit distance, but adds a variable cost adjustment to the cost of gaps, i.e., to insertions and deletions. Using this distance, and tailoring the costs of the edit operation appropriately, it is possible for the frame skip calculator 248 to balance frame skipping (e.g., deletions of some frames, while extending the presentation of other frames to maintain the correct video length/run time) with its impact on the later output at the target device.

In different embodiments, the frame skip calculator 248 can determine, based on the target device display configuration, what a threshold (minimum) edit distance should be for the video content—using a tunable threshold submodule 254—in order to retain a set of frames or prevent/avoid frame skips. The edit distance algorithm 252 will evaluate each set of adjacent/sequential frames in the original video content 202 and determine the difference between consecutive frames (also referred to herein as a subsequence of frames). In one embodiment, if the calculated edit distance between two frames (e.g., a first frame and a second frame) falls below the threshold selected by the tunable threshold submodule 254 for that specific target device display, then the two frames are deemed similar enough so as to permit skipping of one of the frames. For example, if two frames have an edit distance less than the threshold edit distance, then the first frame can be skipped and the display duration of the other frame (e.g., the second frame) can be extended (in this case, doubled). The number of frames that can be skipped can be greater if there are additional frames after the second frame (e.g., a third frame, fourth frame) that are also associated with edit distances that fall below the selected edit distance threshold. The frames that can be skipped are identified and submitted to the video data encoding system 234, and will be used to skip the encoding of the designated frames as well as extend playback duration of the remaining frames to correctly emulate the video's run time. It should be understood that for each type of target display (e.g., a smartwatch, a tablet, an infotainment system display, etc.), the selection of the edit distance threshold by the tunable threshold submodule 252 will vary based on the particular configuration of the display. Thus, a display with low resolution will have a greater/higher edit distance threshold, while a display with high resolution will have a relatively smaller/lower edit distance threshold.

Edit distance values can be computed to obtain a more accurate correlation between two frames of video. In some embodiments, further processing can be performed (not shown in FIG. 2) by the system 250 to generate a correlation score between the two frames using additional indexes such as texture, motion, and associated data such as location and size to correlate each individual frame. The sequence probability scores for each query sequence or frame are calculated. Using rules based on learning a probability, a confidence value is placed on the likelihood of a match.

As described herein, the video data encoding system 234 can encode and transform the original video content 202 based on the received selections and output of the video modulator 240. In addition, in some embodiments, the video data encoding system 234 can also implement a different coding scheme whereby simple videos (e.g., only or primarily comprising of a person's face speaking into the camera) can be converted into a sequence of emojis or other symbols that will represent the facial expression of the person at that time via a symbol encoder module 272. An example of this approach would allow for a person speaking to be encoded as a first "speaker" emoji, the same person laughing being encoded as a second "laughter" emoji, the same person smiling as a third "smile" emoji, etc. The stream or sequence of emojis will be timecoded and used by the decoder/inference engine to determine how the avatar (reference image) should appear during the playback at each time. However, it should be understood that based on the level of facial/pose complexity selected by the system 250, some of these emojis will be skipped or removed due to the target display being ill-suited to the presentation of certain details or in cases where the edit distance is small enough (e.g., blinks, eyebrow raising, dimples, head tilts, etc.).

In some embodiments the system 250 is configured to transmit the encoded output from video data encoding system 234 (encoded data 280) directly to the target device 210 for processing/video synthesizing by the local inference engine 228 as a standard process. In another embodiment, the system 250 is configured to convey the encoded output from video data encoding system 234 (encoded data 280) first to its own cloud-based inference engine 290 (also referred to as a video synthesizer 280 and decoder module 282 in the Mahapatra application), or another remote inference engine, to translate and synthesize/generate the reduced video file.

For example, in some embodiments, the video synthesizer (inference engine) will produce data values and software instructions that, when executed, reconstruct or otherwise infer one or more video frames to be displayed by one or more video output devices based on a reference image and one or more codes or symbols. In one embodiment, one or more neural networks for video synthesizer infer one or more video frames using the reference image(s) as a base image in conjunction with information decoded from one or more codes to indicate updates to said reference image, for example as described in the Liu application. In yet another embodiment, the decision as to where to process the encoded data can be dynamic based on a determination made by a switch module 260. In different embodiments, the switch module 260 includes one or both of a dynamic battery switch module ("battery switch") 292 and a dynamic network bandwidth switch module ("bandwidth switch") 264.

Additional details regarding the switch module 260 and its operation are described with reference to sub-environment 300 in FIG. 3. As noted above, an inference engine is used to perform the processing (translation and conversion) of the encoded data 280 into synthetic video, using a reference image 280 as a baseline during reconstruction of one or more video frames. In some embodiments, the video synthesizer reconstructs, using a neural network, video content from portions of original video content (one or more reference images) and the encoded data. For purposes of this disclosure, a reference image 380 is data comprising information about a single image or frame of the original video content or a profile/account photo or graphic provided by the video sender. For example, the reference image 380 can be sourced from a user's account profile picture for an e-mail service, or a social media, chatting, or videoconferencing app (e.g., WhatsApp®, MS Teams®, Skype®, etc.). In one embodiment, reference image 380, such as a video frame, is a first image in a sequence of images, such as a first frame in a sequence of video frames from the original video. This image can thereafter serve as the person's digital avatar. In some cases, reference image 380 is a component of original video content usable for reconstruction or regeneration of one or more video frames by one or more neural networks for a video synthesizer.

Figure 3:
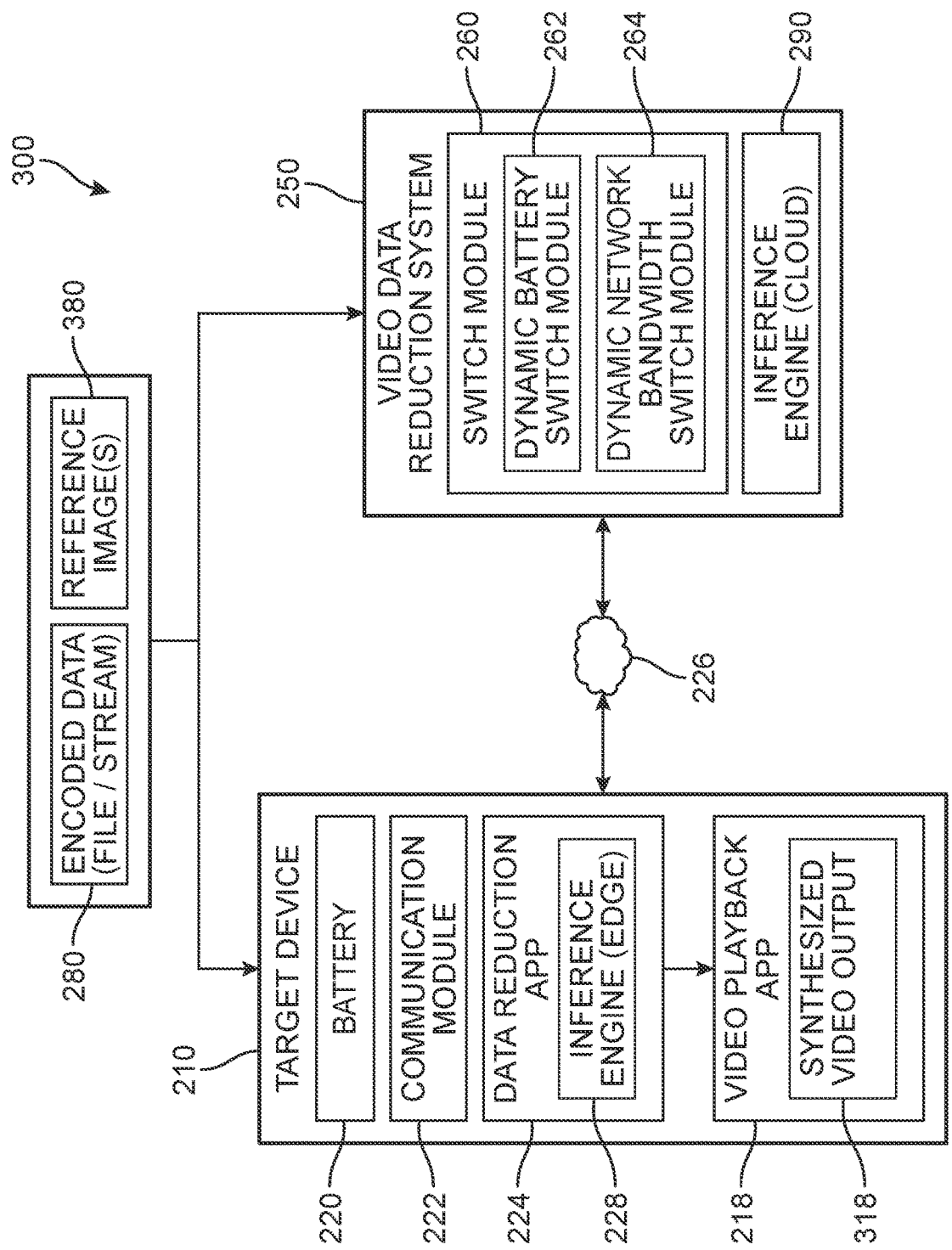
FIG. 3 is a schematic diagram of the video data reduction system dynamically assigning the video synthesis process based on the target device's battery life or bandwidth, according to an embodiment.

As shown in FIG. 3, in some embodiments, in order to more fully accommodate the varying capacities of a target device, the system 250 is configured to adapt in-the-moment to performance-related metrics that can impact the target device 210. More specifically, in one embodiment, the battery switch 262 is configured to detect real-time battery levels of battery 220 at target device 210, for example via information collected by the local data reduction app 224. It can be appreciated that synthesis of a video via local/edge-based inference engine 228 can require a processing load that can deplete power from target device 210. For example, in different embodiments, local inference engine 228 accelerates or otherwise improves inferencing performance of its one or more neural networks using one or more PPUs, such as GPUs. In one embodiment, local inference engine 228 utilizes one or more PPUs, such as GPUs, for any other purpose related to services provided to one or more clients by said system 250. As one example, a GPU for neural network training and a processor for inference can be employed.

As a general matter, a local instance (app) of the inference engine would be smaller, with initial training of its neural network taking place in the cloud, where greater computing resources are available. In some embodiments, the local instance will be more limited in features than the cloud-based inference engine. In one example, the local instance can be tailored to align with the target device's available computing resources. The model can be optimized for each type of device, such that different devices would be provided with different inference engines that were trained to specialize in that device hardware. For example, the inference engine for an E-reader can be trained using a very low output resolution and power, while the inference engine for a smartwatch may be trained with different parameters such as higher resolution and power.

Figure 4:
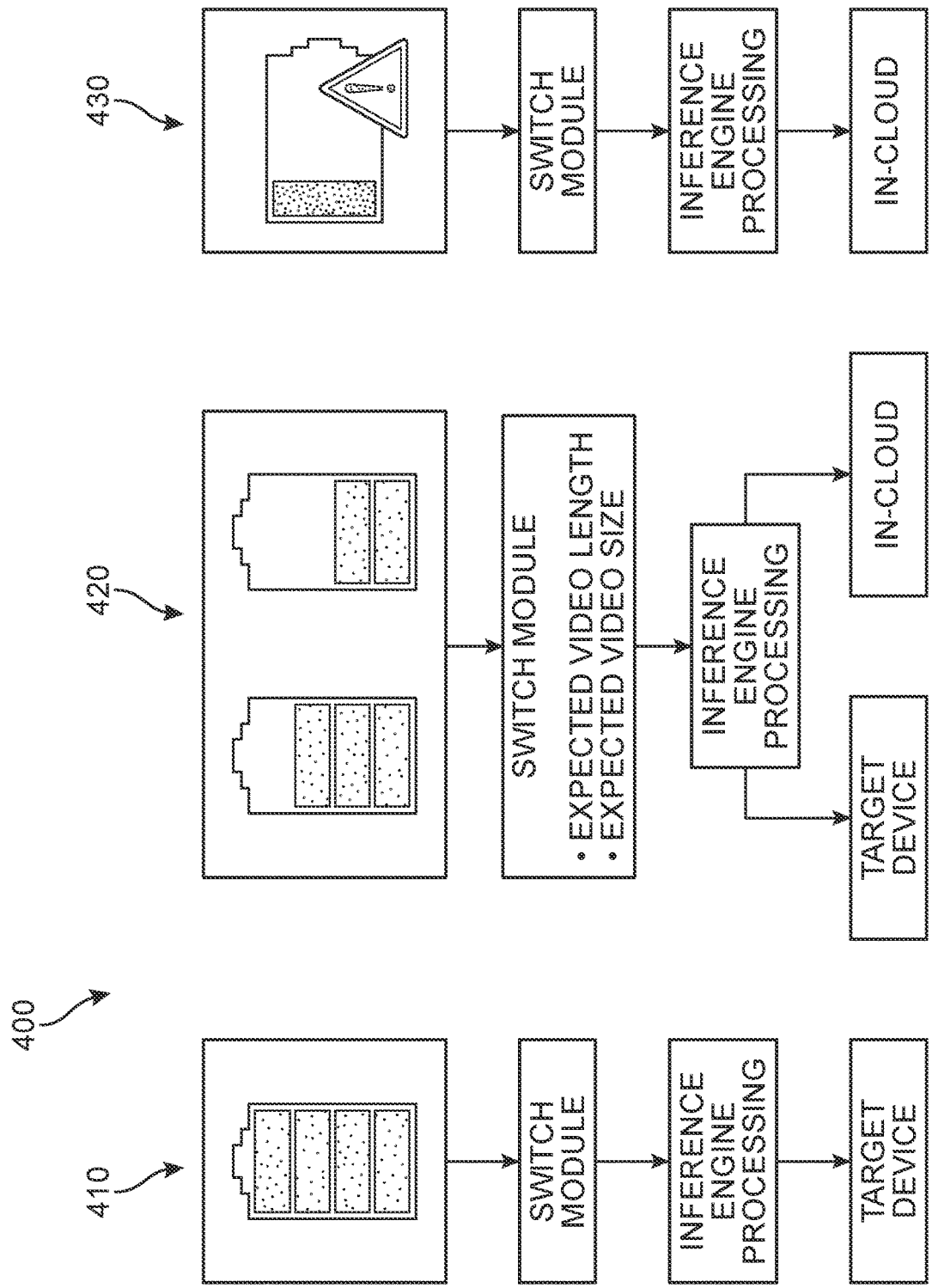
FIG. 4 is a chart depicting examples whereby the video data reduction system selects where the encoded file should be synthesized based on battery life of the target device, according to an embodiment.

Battery life and performance over the course of a video synthetization by the local inference engine 228 will vary from one target device to another. In some embodiments, the battery switch 262 can determine if the capacity status of the battery 220 (e.g., in milliampere hour (mAh) or percentage up to 100%) is at or below a preselected threshold. Based on this determination, the battery switch 262 will decide whether synthesis (inference) of the encoded data 280 should occur in the cloud or at the target device. For example, as shown in a battery switch chart 400 of FIG. 4, if the system 250 determines the battery is at a first level 410, corresponding to a "full" battery (e.g., a level at or greater than 90%), the battery switch 262 will route the processing of the encoded data to the local target device, where a lower resolution/quality video output 318 tailored to the target device display's configuration can be played, for example via video playback app 218.

Similarly, if the system 250 determines the battery is at a second level 420, corresponding to an "intermediate" battery (e.g., a level at or greater than 40%), the battery switch 262 can either default routing of the processing of the encoded data to the inference engine at the local target device or to the inference engine in the cloud, depending on the system settings and/or user preferences. In some embodiments, the expected video size and/or video playback length, if greater than a preselected threshold, can also impact whether the synthesis happens at the local device or in the cloud. For example, if the video size after decoding is expected to be larger than "X" megabytes, and/or the length of the video after decoding is expected to be longer than "Y" minutes, the battery switch 262 can perform the processing in the cloud to better conserve the battery life of the target device for playback of the video. Conversely, if the video size after decoding is expected to be smaller than "X" megabytes, and/or the length of the video after decoding is expected to be shorter than "Y" minutes, the battery switch 262 can perform the processing at the target device to reduce the size of the file that must be transmitted from the system to the device. Furthermore, the battery model/type can also affect the decision of the battery switch 262; for example, a higher capacity battery or newer model may allow for more tolerance and lower the minimum threshold for switching to local device processing.

Finally, if the system 250 determines the battery is at a third level 430, corresponding to a "low" battery (e.g., a level less than 40%), the battery switch 262 will automatically default routing of the processing of the encoded data to the inference engine in the cloud to better conserve the battery life of the target device. It should be understood that the chart 400 is shown for illustrative purposes only, and the categories and levels shown are simply examples. In addition, in some embodiments, the battery switch 262 can be configured to make decisions based on different capacity thresholds tailored to a particular computing device model or different/additional battery-related factors such as expected battery performance based on the target device's current pattern of usage/drain, current display settings (e.g., brightness), etc. in some embodiments, the target device itself can acknowledge its own power depletion or level and generate a request to the system that causes the system to offload video processing to the cloud, allowing the task to be dynamically assignable.

Returning to FIG. 3, in different embodiments, other factors can impact where the processing of the encoded data 280 will occur. More specifically, in one embodiment, the bandwidth switch 264 is configured to detect real-time bandwidth capacity of target device 210, for example via information collected by the local data reduction app 224. It can be appreciated that transmission of a video file—even one that has been substantially reduced in size by the data reduction systems and methods described herein—can nevertheless consume large swath of a network bandwidth. Thus, in some embodiments, if the measurement indicating the maximum capacity of a wired or wireless communications link to transmit data over a network connection in a given amount of time (the data transfer rate, or bandwidth) falls below a particular preselected threshold, the target device 210 may require a more prolonged period of time and/or network cost to download the synthesized video, which can also negatively impact battery life.

In different embodiments, the bandwidth switch 264 is configured to determine if the capacity status of the bandwidth (e.g., in gigabits per second (GGPS) or some other unit of measurement) is at or below a preselected threshold.

Figure 5A:
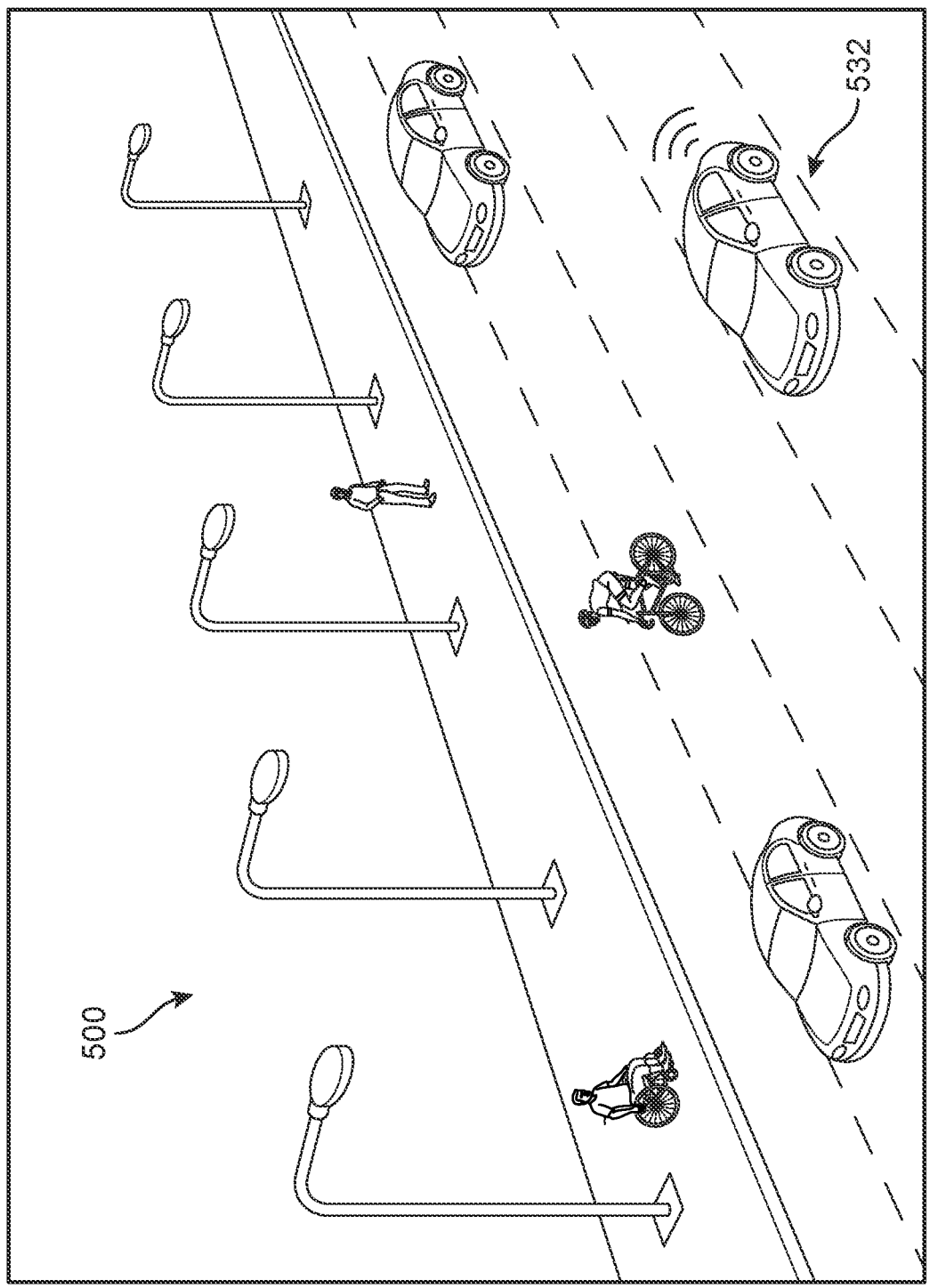
FIGS. 5A, 5B, 6A, and 6B illustrate examples whereby the video data reduction system selects where the encoded file should be synthesized based on bandwidth associated with the target device, according to an embodiment.
Figure 5B:
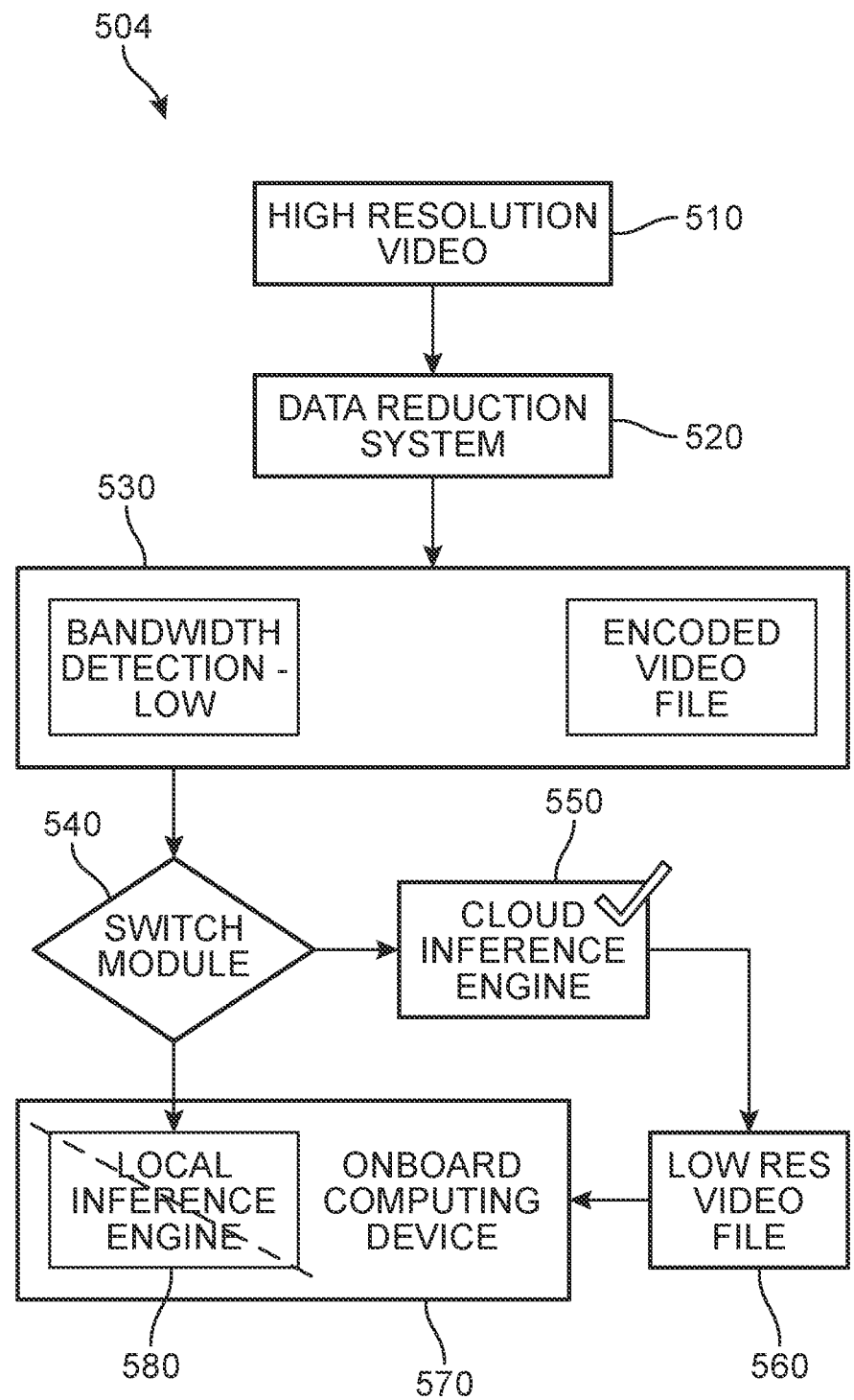

Based on this determination, the bandwidth switch 264 will decide whether synthesis (inference) of the encoded data 280 should occur in the cloud or at the target device. For purposes of illustration, example scenarios employing this operation are shown in FIGS. 5A-6B. In a first scenario, a second autonomous vehicle 532 is traveling through a metropolitan region 500 where network infrastructure is widely available and a first network connectivity 502 is strong. A first flow diagram 504 is depicted in FIG. 5B, where a high-resolution video 510 is received by a data reduction system 520. The data reduction system 520, in a first stage 530, encodes the video (as described above) and determines that the target device bandwidth is higher than its preselected threshold. A switch module 540 then routes the encoded video file to the cloud-based inference engine 550 in response to the determination that the target device bandwidth is above the system threshold. The cloud-based inference engine 550 then generates a low-resolution video file 560 (similar to a GIF of the original video file/high-resolution video 510) that is transmitted over a network to an onboard computing device 570 for the second autonomous vehicle 532 of FIG. 5A. Thus, a local inference engine 580 is not used at this time because the bandwidth is able to readily handle this file size.

Figure 6A:
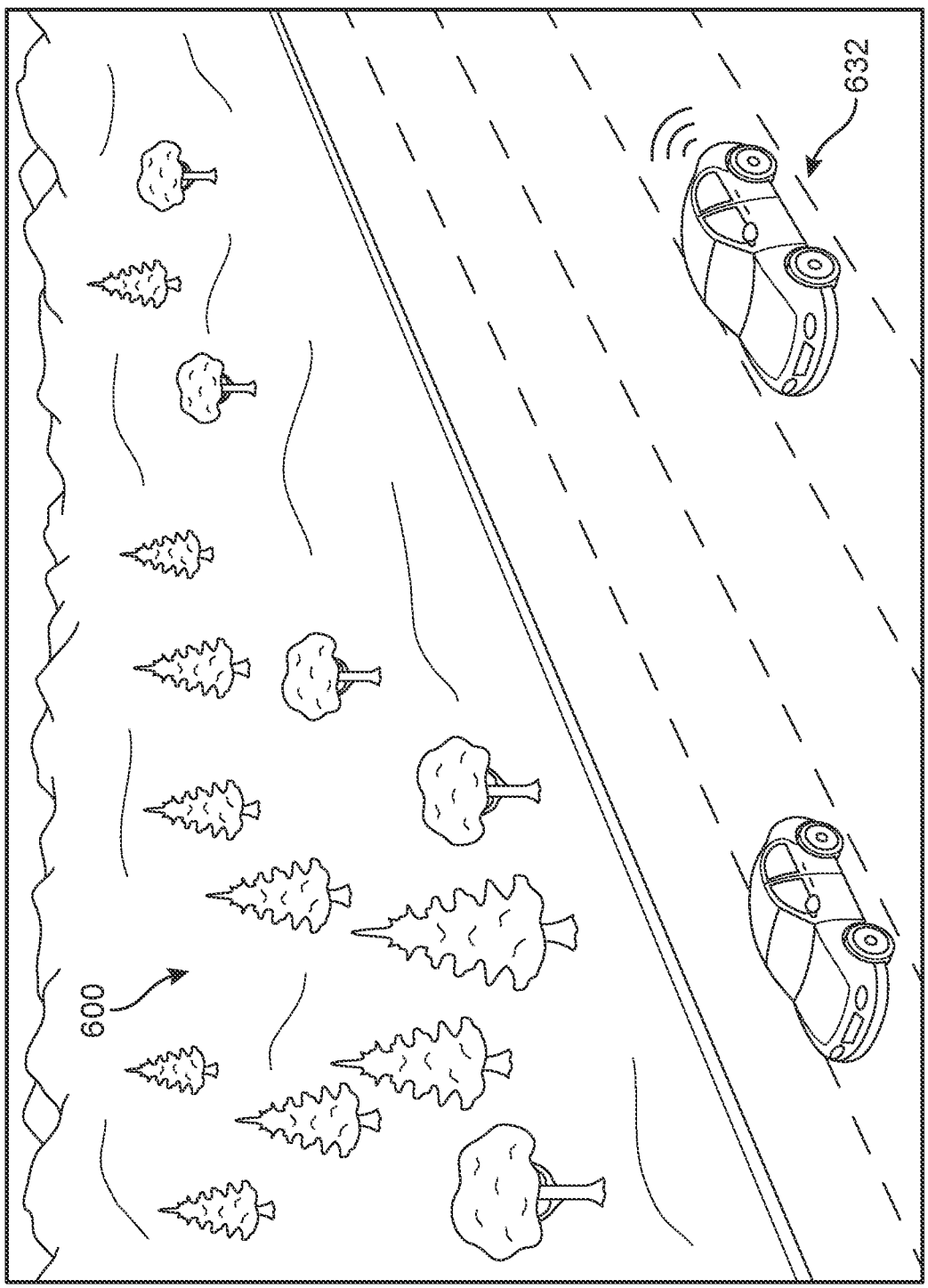
Figure 6B:
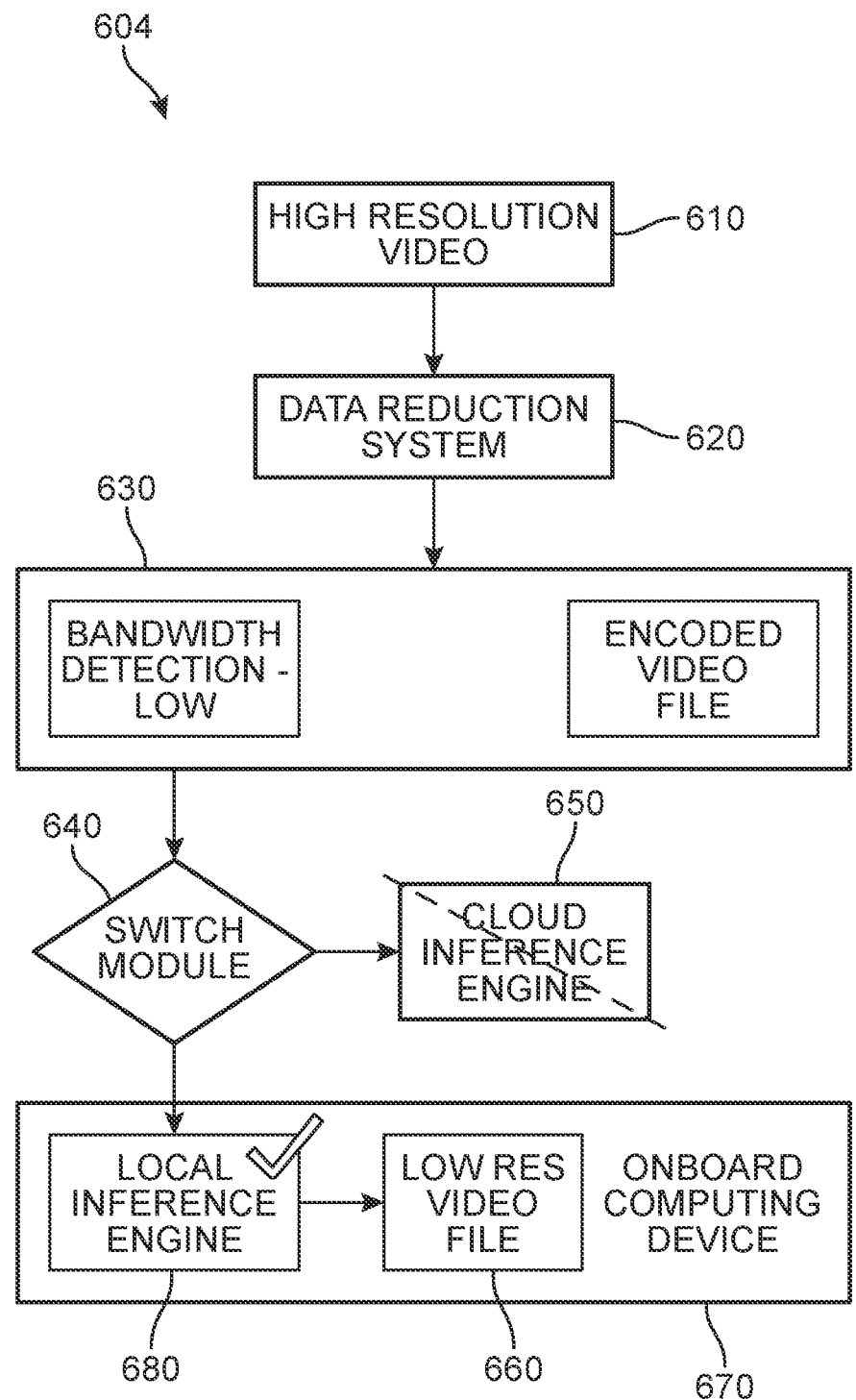

In contrast, when the same second autonomous vehicle 532 is traveling through a rural region 600, as shown in FIG. 6A, where network infrastructure is sparse and a second network connectivity 602 is relatively weak, the response will be different. A second flow diagram 604 representing this process is depicted in FIG. 6B, where a high-resolution video 610 is received by a data reduction system 620. The data reduction system 620, in a first stage 630, encodes the video (as described above) and determines that the target device bandwidth is lower than its preselected threshold. A switch module 640 then routes the encoded video file for transmission over the network to the local inference engine 650 in response to the determination that the target device bandwidth (where the target device in FIGS. 5A and 5B is the same as in FIGS. 6A and 6B) is below the system threshold. The local inference engine 680 then generates a low-resolution video file 660 (similar to a GIF of the original video file/high-resolution video 610) that is played on the display of onboard computing device 670 for the second autonomous vehicle 632 of FIG. 6A. Thus, in this case, a cloud-based inference engine 650 is not used, and instead the processing is performed locally. The limited bandwidth is able to handle the significantly smaller encoded file with much greater speed than it would the larger synthesized video and far larger original video.

FIG. 7 shows a table 700 presenting examples of data reduction and video synthesis that can be performed using the proposed embodiments. The table 700 depicts three different target devices (destination devices) to which a high-resolution (original) video might be sent. For purposes of this example, the original video size can be approximately 20 MB. The table 700 presents a first example 710 in which an e-ink reader display with a first configuration (display configuration "A") includes a frame rate of 16 FPS, a second example 720 in which a vehicle's onboard infotainment system display has a second configuration (display configuration "B") with a frame rate of 30 FPS, and a third example 730 in which a smartwatch display has a third configuration (display configuration "C"). Each of these first, second, and third configurations differ in their spec values. Furthermore, for purposes of this example, the first configuration can be understood to represent the lowest quality display, the third configuration the highest quality display, and the second configuration the display with intermediate quality.

As the video content module of the data reduction system receives the original video, before the video is propagated to the designated recipients (users of the three devices), the system identifies each destination device and their display configurations. In response, for each different display configuration, the data reduction system calculates or otherwise selects values for each of four video content parameters: color complexity, video resolution/facial expression complexity (based on target display resolution), frame rate, and frame skips. The value assigned to each of these four parameters will then be used during the encoding process to limit or modulate the quality, amount, or features of the original video that will be encoded.

More specifically, in the first example 710, the data reduction system determines the e-ink reader display can only present a color complexity of up to 10% of what the full-resolution video had captured, a resolution level of 50% (revealing most macro-or gross movements and a few micro-movements), a frame rate of 5% (the refresh rate of the display being very slow), and calculates up to 60% of the total number of frames comprising the original video can be skipped. This information is shared with the video data encoding system, which encodes the original video within the boundaries of detail and richness of color and expression that have been defined by the data reduction system. A video synthesized based on this encoded file may have (for example) a final size of 20 KB.

Similarly, in the second example 720, the data reduction system determines the infotainment display for the vehicle can only present a color complexity of up to 25% of what the full-resolution video had captured, a resolution level of 70% (revealing all macro-or gross movements and more micro-movements), a frame rate of 20% (the refresh rate of the display being slow but higher than that of the e-ink reader), and calculates up to 45% of the total number of frames comprising the original video can be skipped. This information is shared with the video data encoding system, which encodes the original video within the boundaries of detail and richness of color and expression that have been defined by the data reduction system. A video synthesized based on this encoded file may have (for example) a final size of 35 KB.

In the third example 730, the data reduction system determines the smartwatch display can only present a color complexity of up to 40% of what the full-resolution video had captured, a resolution level of 30% (the small screen size being capable of revealing only some macro-or gross movements and few if any micro-movements), a frame rate of 65%, and calculates up to 30% of the total number of frames comprising the original video can be skipped due to the higher resolution of the screen, which increases or raises the edit distance threshold. This information is shared with the video data encoding system, which encodes the original video within the boundaries of detail and richness of color and expression that have been defined by the data reduction system. A video synthesized based on this encoded file may have (for example) a final size of 55 KB.

Figure 8:
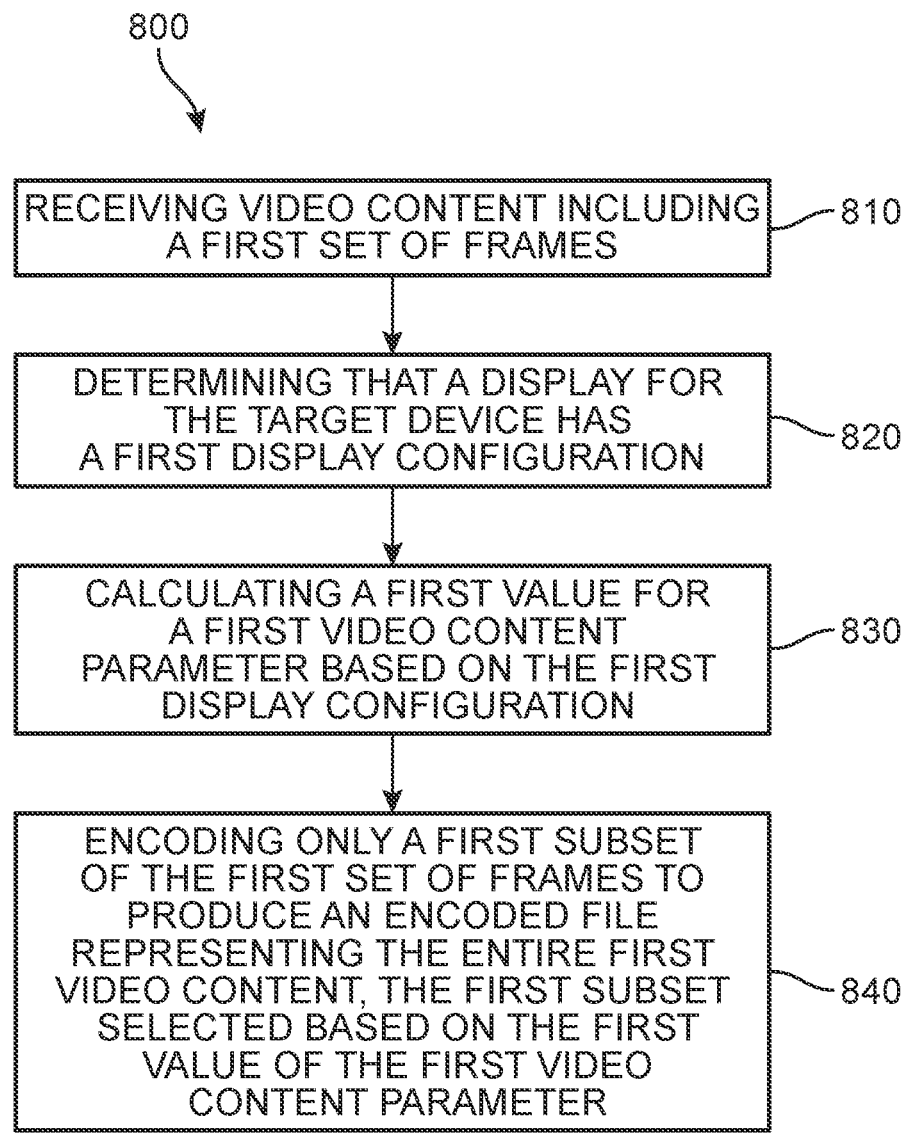
FIG. 8 is a flow diagram of a process of computer-implemented method for selectively encoding video data for a device with a particular display configuration, according to an embodiment.

FIG. 8 is a flow chart illustrating an embodiment of a computer-implemented method 800 of selectively encoding video data for a device with a particular display configuration. The method 800 includes a first operation 810 of receiving, at a data reduction system, first video content designated for delivery to a computing device, the first video content including a first set of frames (comprising a plurality or sequence of at least two individual frames), and a second operation 820 of determining, at the data reduction system, that a first display for the computing device is associated with a first display configuration. A third operation 830 includes calculating, at the data reduction system, a first value for a first video content parameter based on the first display configuration, and a fourth operation 840 includes encoding only a first subset of the first set of frames (where the first subset is smaller/has fewer frames than the full first set of frames) to produce a first encoded file representing the entire first video content, the first subset selected based on the first value of the first video content parameter.

In different embodiments, the method 800 can include additional operations or aspects. For example, the method 800 can also include an operation of generating, via a first inference engine, a first synthesized video (in lieu of the first video content) based on the encoded file. In another example, the method 800 also includes an operation of transmitting, from the data reduction system and to the computing device, the first synthesized video rather than the first video content, thereby replacing a larger file with a smaller file while maintaining a similar output by the target display. In some embodiments, a first size of the first synthesized video is smaller than a second size of the first video content, while the playback duration of the first synthesized video and the first video content are approximately equal.

In different embodiments, the inference engine can be trained on a dataset which has encoding for different situations. In some examples, the inference engine is configured to infer data encoding for different contexts as a starting point for the system. In one embodiment, the inference engine can dynamically update its encoding process based on or in response to perceived changes to the recipient's device condition or configuration. In some embodiments, the method also includes an operation of generating, via a first inference engine, a first synthesized video based on the first encoded file, the first inference engine being trained on a dataset that includes a plurality of encoded files, where each encoded file of the plurality of encoded files is optimized or selected for playback on a device display of a different display configuration. In other words, each encoded file includes an encoding for the same video but for playback on a different display configuration. Thus, the inference engine is trained such that each display configuration that is detected will trigger a different encoding approach or level that is best suited to that display configuration.

In some embodiments, the method can also include operations of receiving, at the data reduction system, second video content designated for delivery to the computing device, the second video content including a second set of frames, determining, at the data reduction system, that the first display for the computing device is now associated with a second display configuration that differs from the first display configuration, calculating, at the data reduction system, a second value for a second video content parameter based on the second display configuration, encoding only a second subset of the second set of frames to produce a second encoded file representing the entire second video content, the second subset selected based on the second value of the second video content parameter, and generating, via the first inference engine, a second synthesized video based on the second encoded file.

In some embodiments, the method 800 also includes operations of identifying, at the data reduction system, a first battery level of the computing device, routing, in those cases where the first battery level has been determined to fall above a first threshold, the first encoded file to a first inference engine running on the computing device and causing the first inference engine to generate, in lieu of the first video content, a first synthesized video based on the first encoded file, and routing, in those cases where the where the first battery level has been determined to fall below the first threshold, the first encoded file to a second inference engine running on a remote server and causing the second inference engine to generate in lieu of the first video content, the first synthesized video.

In another embodiment, the method 800 further includes operations of identifying, at the data reduction system, a first bandwidth of the computing device, routing, only in those cases where the first bandwidth has been determined to fall below a first threshold, the first encoded file to a first inference engine running on the computing device and causing the first inference engine to generate, in lieu of the first video content, a first synthesized video based on the first encoded file, and routing, in those cases where the first bandwidth has been determined to fall above the first threshold, the first encoded file to a second inference engine running on a remote server and causing the second inference engine to generate, in lieu of the first video content, the first synthesized video.

In one example, the first playback parameter refers to one of a frame rate, a facial expression and pose complexity level, a color complexity level, and a threshold edit distance. In another example, the first display configuration refers to one or more of resolution, frames per second, refresh rate, dots per inch (DPI), and screen size. In different embodiments, the computing device is one of an e-ink display reader, a smartwatch, and an infotainment system for an autonomous vehicle. In another embodiment, the first synthesized video is generated based on a reference image corresponding to an account profile picture of the sender of the first video content.

Other methods can also be contemplated within the scope of this disclosure. For example, a computer-implemented method of dynamically distributing, assigning, or routing the processing of encoded data is disclosed. The method includes a first operation of receiving, at a data reduction system, first video data designated for delivery to a computing device, the first video data including a first set of frames (comprising a plurality or sequence of at least two individual frames), and a second operation of encoding only a first subset of the first set of frames (where the first subset is smaller than the full first set of frames) to produce an encoded file representing the entire first video content. A third operation includes identifying, at the data reduction system, a first battery level of the computing device, and a fourth operation includes routing, in those cases where the first battery level is determined to be above a first threshold, the encoded file to a first inference engine running on the computing device and causing the first inference engine to generate, in lieu of the first video content, a first synthesized video based on the encoded file. A fifth operation includes routing, in cases where the first battery level is determined to be below the first threshold, the encoded file to a second inference engine running on a remote server and causing the second inference engine to generate, in lieu of the first video content, the first synthesized video.

In other embodiments, this method may include additional operations or aspects. In one embodiment, the method also includes an operation of transmitting, from the second inference engine and to the computing device, the first synthesized video (in those cases where the first battery level was determined to be below the first threshold). In another example, the method further includes operations of determining, at the data reduction system, that a first display for the computing device is associated with a first display configuration, and calculating, at the data reduction system, a first value for a first video content parameter based on the first display configuration, where the first subset is selected based on the first value of the first video content parameter. In one embodiment, the first playback parameter refers to one of a frame rate, a facial expression and pose complexity level, a color complexity level, and a threshold edit distance. In another embodiment, the first display configuration refers to one or more of resolution, frames per second, refresh rate, dots per inch (DPI), and screen size.

Other methods can also be contemplated within the scope of this disclosure. For example, an alternate computer-implemented method of dynamically distributing, assigning, or routing the processing of encoded data is disclosed. This method includes a first operation of receiving, at a data reduction system, first video data designated for delivery to a computing device, the first video data including a first set of frames (comprising a plurality or sequence of at least two individual frames), and a second operation of encoding only a first subset of the first set of frames (where the first subset is smaller than the full first set of frames) to produce an encoded file representing the entire first video content. The method also includes a third operation of identifying, at the data reduction system, a first bandwidth of the computing device, and a fourth operation of routing, in cases where the first bandwidth is determined to fall below a first threshold, the encoded file to a first inference engine running on the computing device and causing the first inference engine to generate, in lieu of the first video content, a first synthesized video based on the encoded file. The method also includes a fifth operation of routing, in cases where the first bandwidth is determined to fall above the first threshold, the encoded file to a second inference engine running on a remote server and causing the second inference engine to generate, in lieu of the first video content, the first synthesized video.

In other embodiments, this method may include additional operations or aspects. In one embodiment, the method also includes an operation of transmitting, from the second inference engine and to the computing device, the first synthesized video (in those cases where the first bandwidth was determined to fall above the first threshold). In another example, the method further includes operations of determining, at the data reduction system, that a first display for the computing device is associated with a first display configuration, and calculating, at the data reduction system, a first value for a first video content parameter based on the first display configuration, where the first subset is selected based on the first value of the first video content parameter. In one embodiment, the first playback parameter refers to one of a frame rate, a facial expression and pose complexity level, a color complexity level, and a threshold edit distance. In another embodiment, the first display configuration refers to one or more of resolution, frames per second, refresh rate, dots per inch (DPI), and screen size.

It should be understood that, in different embodiments, the operations disclosed above for each of the three methods can be implemented as a system that includes a processor and machine-readable media including instructions which, when executed by the processor, cause the processor to perform each of the recited operations.

Media generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® GeForce Now (GFN), Google® Stadia, and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present disclosure may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct disclosure as defined by the claims. Any feature or element of any embodiment may also be combined with features or elements from other inventions to form another distinct disclosure as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:
1. A method comprising:
receiving a first video content including a plurality of frames;
determining a first display configuration for a target display;
detecting a plurality of facial expressions within the plurality of frames;
identifying a first subset of facial expressions in the plurality of facial expressions that are visible on the target display based on the first display configuration and a second subset of facial expressions in the plurality of facial expressions that are not visible on the target display based on the first display configuration;
generating a first encoded file for an inference engine associated with the target display, wherein the inference engine comprises a neural network for generating synthetic video from encoded files, wherein the first encoded file includes information associated with the first subset of facial expressions and wherein the first encoded file does not include information associated with the second subset of facial expressions; and
sending the first encoded file to the inference engine.

2. The method of claim 1, wherein detecting the plurality of facial expressions includes applying facial expression recognition to the plurality of facial expressions.

3. The method of claim 1, wherein the first encoded file is compressed in size relative to another encoded file that includes information about both the first subset of facial expressions and the second subset of facial expressions.

4. The method of claim 1, further comprising generating, via the inference engine, a first synthesized video based on the first encoded file; and wherein a size of the first synthesized video is smaller than a size of the first video content, while the playback duration of the first synthesized video and the first video content are approximately equal.

5. The method of claim 1, further comprising:
identifying a battery level of a computing device;
routing, in cases where the battery level is above a threshold, the first encoded file to a first inference engine running on the computing device and causing the first inference engine to generate a first synthesized video based on the first encoded file; and
routing, in cases where the battery level is below the threshold, the first encoded file to a second inference engine running on a server remote from the computing device and causing the second inference engine to generate the first synthesized video.

6. The method of claim 1, further comprising:
identifying a bandwidth of a computing device;
routing, in cases where the bandwidth is below a threshold, the first encoded file to a first inference engine running on the computing device local to the computing device and causing the first inference engine to generate a first synthesized video based on the first encoded file; and
routing, in cases where the bandwidth is above the threshold, the first encoded file to a second inference engine running on a server remote from the computing device and causing the second inference engine to generate the first synthesized video.

7. The method of claim 1, wherein generating the first encoded file further includes considering a threshold edit distance.

8. The method of claim 1, wherein the first display configuration includes one or more of display resolution, frames per second refresh rate, dots per inch (DPI), or screen size.

9. The method of claim 1, wherein a computing device associated with the target display is one of an e-ink display reader, a smartwatch, or an infotainment system for an autonomous vehicle.

10. The method of claim 1, further comprising generating, via the inference engine, a first synthesized video using the first encoded file and a reference image of a sender of the first video content.

11. The method of claim 10, wherein the reference image is extracted from the first video content.

12. A method comprising:
receiving a video content including a plurality of frames;
determining a display configuration for a target display;
detecting a plurality of facial expressions within the plurality of frames;
identifying a first subset of facial expressions in the plurality of facial expressions that are visible on the target display based on the display configuration and a second subset of facial expressions in the plurality of facial expressions that are not visible on the target display based on the display configuration;
generating an encoded file, the encoded file including information about the first subset of facial expressions and the encoded file not including information about the second subset of facial expressions;
identifying a battery level of a computing device;
routing, in cases where the battery level is above a threshold, the encoded file to a first inference engine running on the computing device and causing the first inference engine to generate a synthesized video based on the encoded file, wherein the first inference engine comprises a first neural network for generating synthetic video from encoded files; and
routing, in cases where the battery level is below the threshold, the encoded file to a second inference engine running on a server remote from the computing device and causing the second inference engine to generate the synthesized video, wherein the second inference engine comprises a second neural network for generating synthetic video from encoded files,
wherein a size of the synthesized video is smaller than a size of the video content.

13. The method of claim 12, further comprising transmitting, from the second inference engine and to the computing device, the synthesized video.

14. The method of claim 12, wherein the display configuration includes one or more of display resolution, frames per second refresh rate, dots per inch (DPI), or screen size.

15. The method of claim 12, wherein detecting the plurality of facial expressions further includes applying facial expression recognition to the plurality of facial expressions.

16. A method comprising:
receiving a video content including a plurality of frames;
determining a display configuration for a target display;
detecting a plurality of facial expressions within the plurality of frames;
identifying a first subset of facial expressions in the plurality of facial expressions that are visible on the target display based on the display configuration and a second subset of facial expressions in the plurality of facial expressions that are not visible on the target display based on the display configuration;
generating an encoded file, the encoded file including information about the first subset of facial expressions and the encoded file not including information about the second subset of facial expressions;
identifying a first bandwidth of a computing device;
routing, in cases where the first bandwidth is below a threshold, the encoded file to a first inference engine running on the computing device and causing the first inference engine to generate a synthesized video based on the encoded file, wherein the first inference engine comprises a first neural network for generating synthetic video from encoded files; and
routing, in cases where the bandwidth is above the threshold, the encoded file to a second inference engine running on a server remote from the computing device and causing the second inference engine to generate the synthesized video, wherein the second inference engine comprises a second neural network for generating synthetic video from encoded files,
wherein a size of the synthesized video is smaller than a size of the video content.

17. The method of claim 16, further comprising transmitting, from the second inference engine and to the computing device, the synthesized video.

18. The method of claim 16, wherein the computing device is one of an e-ink display reader, a smartwatch, or an infotainment system for an autonomous vehicle.

19. The method of claim 16, wherein the display configuration includes one or more of display resolution, frames per second refresh rate, dots per inch (DPI), or screen size.

20. The method of claim 16, wherein identifying facial expressions that would be visible on the target display further includes applying facial expression recognition to the plurality of facial expressions.

* * * * *